US012658776B2

(12) United States Patent
Burkhart et al.

(10) Patent No.: US 12,658,776 B2
(45) Date of Patent: Jun. 16, 2026

(54) MULTI-FREQUENCY VOLTAGE CONVERTER

(71) Applicant: Advanced Micro Devices, Inc., Santa Clara, CA (US)

(72) Inventors: Justin Michael Burkhart, Boxborough, MA (US); Matthew Straayer, Boxborough, MA (US); Eric Scott Bohannon, Rochester, NY (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 339 days.

(21) Appl. No.: 18/465,709

(22) Filed: Sep. 12, 2023

(65) Prior Publication Data

US 2024/0291371 A1    Aug. 29, 2024

Related U.S. Application Data

(60) Provisional application No. 63/487,585, filed on Feb. 28, 2023.

(51) Int. Cl.
*H02M 1/00*      (2006.01)
*H02M 3/156*     (2006.01)

(52) U.S. Cl.
CPC ....... *H02M 1/0019* (2021.05); *H02M 3/1566* (2021.05)

(58) Field of Classification Search
CPC .......................... H02M 1/0019; H02M 3/1566
See application file for complete search history.

(56) References Cited

U.S. PATENT DOCUMENTS

| | | | | |
|---|---|---|---|---|
| 7,615,982 B1 * | 11/2009 | Guo | .................... | H02M 3/1584 |
| | | | | 323/286 |
| 8,552,704 B2 * | 10/2013 | Kiadeh | ............... | H02M 3/1584 |
| | | | | 363/72 |
| 10,503,227 B2 * | 12/2019 | Bharath | .................. | H02M 1/14 |
| 2020/0142436 A1 * | 5/2020 | Chang | ..................... | G05F 1/575 |
| 2022/0263410 A1 * | 8/2022 | Saggini | ................... | H02M 3/07 |
| 2025/0062678 A1 * | 2/2025 | Venkatraman | ...... | H02M 3/1586 |

* cited by examiner

*Primary Examiner* — Adolf D Berhane
(74) *Attorney, Agent, or Firm* — Greenberg Traurig, LLP

(57)          ABSTRACT

The disclosed voltage regulator includes multiple voltage converter circuits. Each of the voltage converter circuits can be configured to operate at respective switching frequencies to deliver current to an output supply voltage. The voltage regulator can include a control circuit that regulates the output supply voltage using the voltage converter circuits. Various other methods and systems are also disclosed.

20 Claims, 6 Drawing Sheets

Method
600

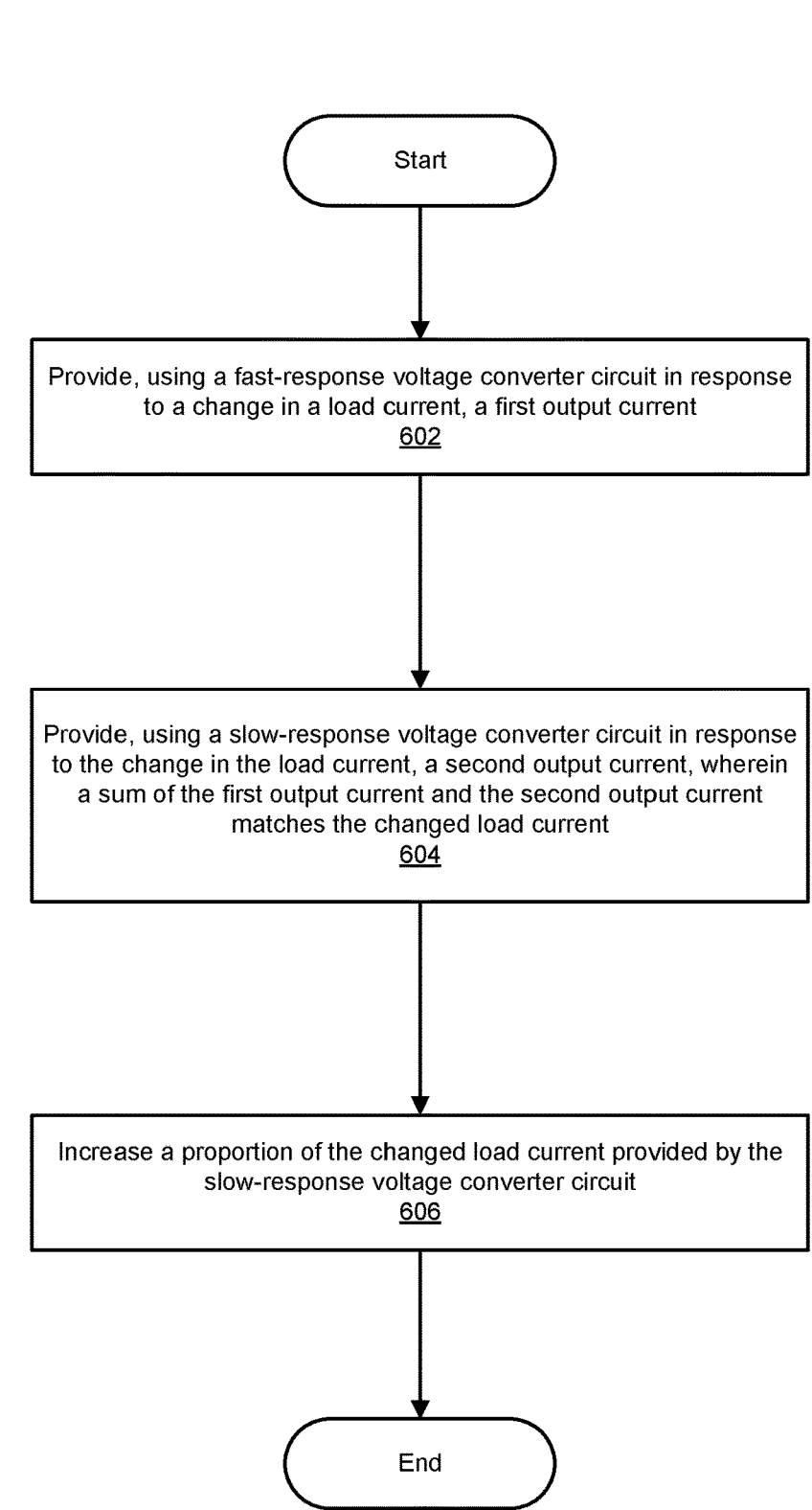

Start

Provide, using a fast-response voltage converter circuit in response to a change in a load current, a first output current
602

Provide, using a slow-response voltage converter circuit in response to the change in the load current, a second output current, wherein a sum of the first output current and the second output current matches the changed load current
604

Increase a proportion of the changed load current provided by the slow-response voltage converter circuit
606

End

*FIG. 6*

MULTI-FREQUENCY VOLTAGE CONVERTER

CROSS REFERENCE TO RELATED APPLICATION

This application claims the benefit of U.S. Provisional Application No. 63/487,585, filed 28 Feb. 2023, the disclosure of which is incorporated, in its entirety, by this reference.

BACKGROUND

Challenges for current delivery for high-performance computing include overcoming conduction losses and voltage gradients resulting from large currents flowing across resistive metal as current density requirements from bumps, power planes, and vias often exceed their limits. Additionally, due to the limited ability to lower an impedance of a power delivery network, regulation accuracy can suffer during large load current transient events. Integrated voltage regulators (IVR) can be integrated into a device package (e.g., near the load) to reduce PCB and package bump currents to address some of the current density and impedance issues but can suffer from low efficiency. Although a high switching frequency allows a high closed-loop bandwidth to improve regulation accuracy during high current transient event load changes, the reduced efficiency associated with high switching frequency can stress thermal limits, which restricts an amount of the total power that can be used for compute performance.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 6 is a flow diagram of an exemplary method for voltage regulation with a multi-frequency voltage converter.

Figure 1B:
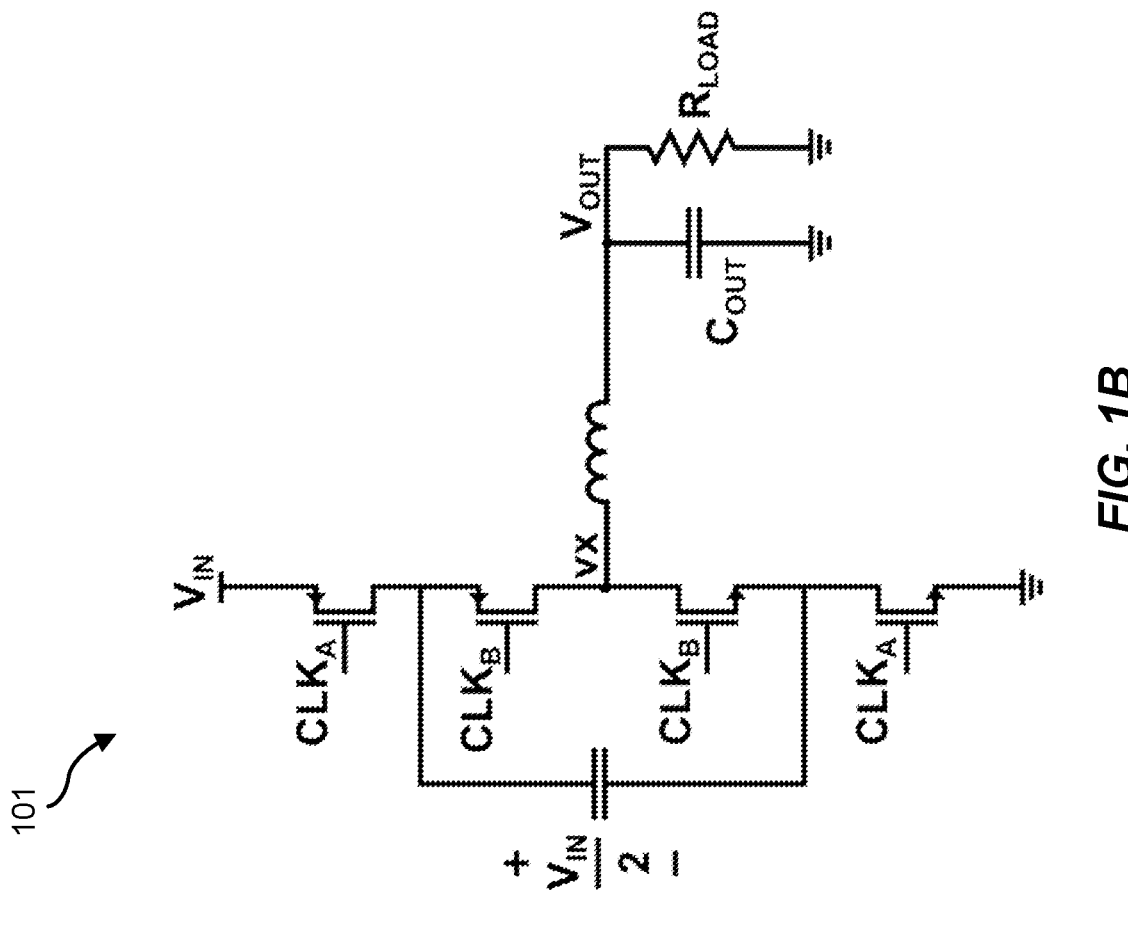
FIGS. 1A-B illustrate example buck converter circuits.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to a DC/DC converter capable of multiple parallel switching frequencies. As will be explained in greater detail below, implementations of the present disclosure provide a DC/DC converter having parallel paths for a current delivery path. A first path includes a first converter circuit configured to operate at a lower switching frequency (e.g., compared to a second path) and can be optimized to deliver most of the current at high efficiency. The second path can include a second converter circuit configured to operate at a higher switching frequency (e.g., compared to the first path), which can deliver less of the total current on average, and can be optimized to achieve tight regulation accuracy. Thus, the DC/DC converter can advantageously provide efficiency and regulation accuracy.

In one implementation, a voltage regulator includes a first voltage converter circuit configured to deliver current to an output supply voltage, a second voltage converter circuit configured to deliver current to the output supply voltage, and a control circuit configured to regulate the output supply voltage using the first voltage converter circuit and the second voltage converter circuit.

In some examples, the first voltage converter circuit is configured for a first switching frequency and the second voltage converter circuit is configured for a second switching frequency. In some examples, the first switching frequency is slower than the second switching frequency.

In some examples, the first voltage converter circuit comprises a first inductor topology and the second voltage converter circuit comprises a second inductor topology. In some examples, the first inductor topology includes a magnetic core inductor, and the second inductor topology includes an air core inductor.

In some examples, the first voltage converter circuit and the second voltage converter circuit are connected in parallel. In some examples, the voltage regulator further includes a first input voltage for the first voltage converter circuit and a second input voltage for the second voltage converter circuit. In some examples, the first voltage converter circuit is configured for variable frequency operation.

In some examples, the control circuit includes a voltage-based feedback loop. In some examples, the control circuit includes a current-based feedback loop.

In one implementation, device package includes a die and a voltage regulator. The voltage regulator includes a first voltage converter circuit vertically integrated with the die and configured to deliver current to a supply voltage for the die, a second voltage converter circuit configured to deliver current to the supply voltage, and a control circuit configured to regulate the supply voltage using the first voltage converter circuit and the second voltage converter circuit.

In some examples, the first voltage converter circuit is configured for a first switching frequency and the second voltage converter circuit is configured for a second switching frequency that is faster than the first switching frequency. In some examples, the first voltage converter circuit comprises a first inductor topology vertically integrated with the die and the second voltage converter circuit comprises a second inductor topology vertically integrated with the die. In some examples, the first inductor topology includes a magnetic core inductor, and the second inductor topology includes an air core inductor.

In some examples, the first voltage converter circuit and the second voltage converter circuit are connected in parallel. In some examples, the device package further includes a first input voltage for the first voltage converter circuit and a second input voltage for the second voltage converter circuit.

In some examples, the first voltage converter circuit is configured for variable frequency operation. In some examples, the control circuit includes a voltage-based feedback loop. In some examples, the control circuit includes a current-based feedback loop.

In one implementation, a method for voltage regulation using a multi-frequency voltage regulator includes (i) providing, using a fast-response voltage converter circuit in response to a change in a load current, a first output current, (ii) providing, using a slow-response voltage converter circuit in response to the change in the load current, a second output current, wherein a sum of the first output current and the second output current matches the changed load current, and (iii) increasing a proportion of the changed load current provided by the slow-response voltage converter circuit.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1A-6, detailed descriptions of multi-frequency voltage regulators. Detailed descriptions of example voltage regulator circuits and/or devices incorporating voltage regulator circuits will be provided in connection with FIGS. 1-5. Detailed descriptions of corresponding computer-implemented methods will also be provided in connection with FIG. 6.

Figure 1A:
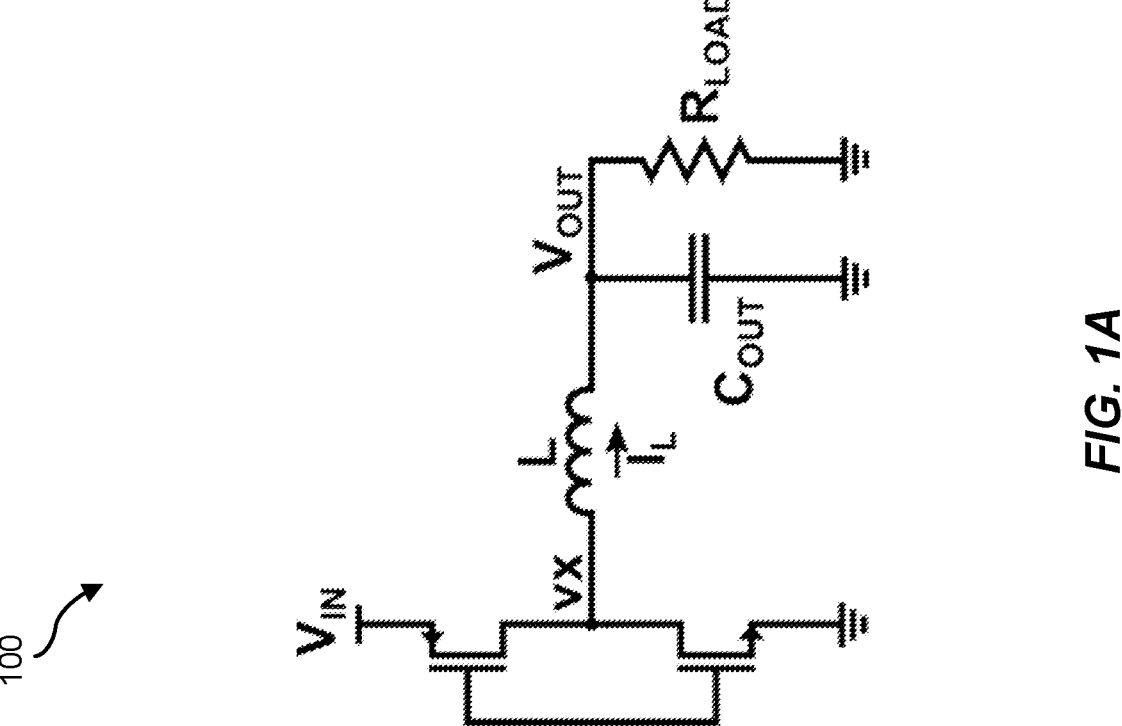

FIG. 1A illustrates a buck converter 100 which can be configured to operate at a certain switching frequency. FIG. 1A includes an input voltage ($V_{IN}$), an output voltage (VOUT) that relates to a voltage vx between $V_{IN}$ and a ground GND (e.g., based on switching duty-cycle), and a load current ($R_{LOAD}$). An inductance (L), switching frequency ($F_{SW}$), switch resistances, and output capacitance ($C_{OUT}$) can be selected (e.g., by accordingly configuring buck converter 100 using appropriate components) for performance requirements. For example, $F_{SW}$ can be selected to balance a volume of the buck converter with efficiency. L can be selected for a desired peak-to-peak current ($I_{PP}$) defined by the following equation:

$$I_{PP} = \frac{V_{OUT}}{L \cdot F_{SW}} \cdot \frac{\frac{V_{IN}}{V_{OUT}} - 1}{\frac{V_{IN}}{V_{OUT}}} \qquad \text{Equation 1}$$

If an inductor can be scaled with constant L/R (and no AC loss in the inductor), optimal efficiency with respect to a load current ($I_{LOAD}$) can be defined by the following equation:

$$I_{PP} = 2 \cdot I_{LOAD} \qquad \text{Equation 2}$$

Switch (e.g., FET) sizes for the two switches in FIG. 1A can be selected to balance capacitance discharge losses with conduction losses. Thus, based on components used, buck converter 100 can be configured to operate at $F_{SW}$.

FIG. 1B illustrates a multi-level buck converter 101 corresponding to a 3-level buck converter as a variation of buck converter 100. Voltage vx can be switched to either $V_{IN}$, $V_{IN}/2$, or GND. For instance, switching with half the voltage at twice the frequency can provide up to a four times benefit on inductor requirements or can switch slower for a given inductance to improve efficiency. However, this can require adding a high quality flying capacitor. In addition, this multi-level design can be used to either improve efficiency or reduce inductor requirements and there is no resistance penalty because a 3-level buck can use cascode-FETs. A peak-to-peak current transfer function can have a null at duty cycle=0.5, which can be exploited to always operate near the null to reduce the inductance required.

The design space for buck regulators can contain trade-offs between four fundamental vectors: power density (e.g., A/mm$^2$, as load power density increases, buck power density must also increase to provide vertical power delivery), efficiency (which can be constrained by a thermal budget because it is desirable for as much of the thermal budget to go to compute performance as possible, current requirement at the voltage regulator (VR) input, and battery life), cost (e.g., silicon cost, passive component cost, packaging costs), and regulation accuracy (DC setpoint accuracy can be constrained by silicon design complexity, DC voltage gradients can be influenced by the available placements and power density of the VR, and AC regulation or transient response balances efficiency with power density). Accordingly, high efficiency often requires higher cost and lower power density, lower cost often requires lower efficiency, and tighter regulation accuracy often requires either lower efficiency or lower power density.

Higher efficiency can often be achieved through improved utilization of the volume available to the buck converter. Power FET losses $P_{LOSS,OPT}$ (e.g., conduction+capacitive discharge) are reduced with switching frequency as follows:

$$\frac{P_{Loss,OPT}}{P_{out}} = \frac{V_{IN}}{V_{OUT}} \sqrt{2 \cdot R_{ON} C \cdot F_{SW}} \qquad \text{Equation 3}$$

The inductance required ($L_{REQ}$) scales inversely proportional to switching frequency as follows:

$$L_{REQ} \propto \frac{V}{Ipp \cdot F_{sw}} \qquad \text{Equation 4}$$

Moreover, inductor performance can benefit from utilizing more volume as follows:

$$L \cdot I \propto B_{Sat} \cdot AREA_{CORE} \cdot N \qquad \text{Equation 5}$$

Thus, to maximize efficiency, it can be desirable to maximize the inductor core volume. In addition, output voltage droop can be minimized when regulator open loop gain and closed loop bandwidth is increased. Closed-loop bandwidth can be limited by switching frequency of the DC/DC converter. Power FET losses also increases with switching frequency (see Equation 3).

Accordingly, multiple phases can allow a DC/DC converter to operate with higher bandwidth and/or transient response for the same inductance per phase and/or switching frequency. Coupled inductors can also be leveraged with multiple phase operation.

Figure 2:
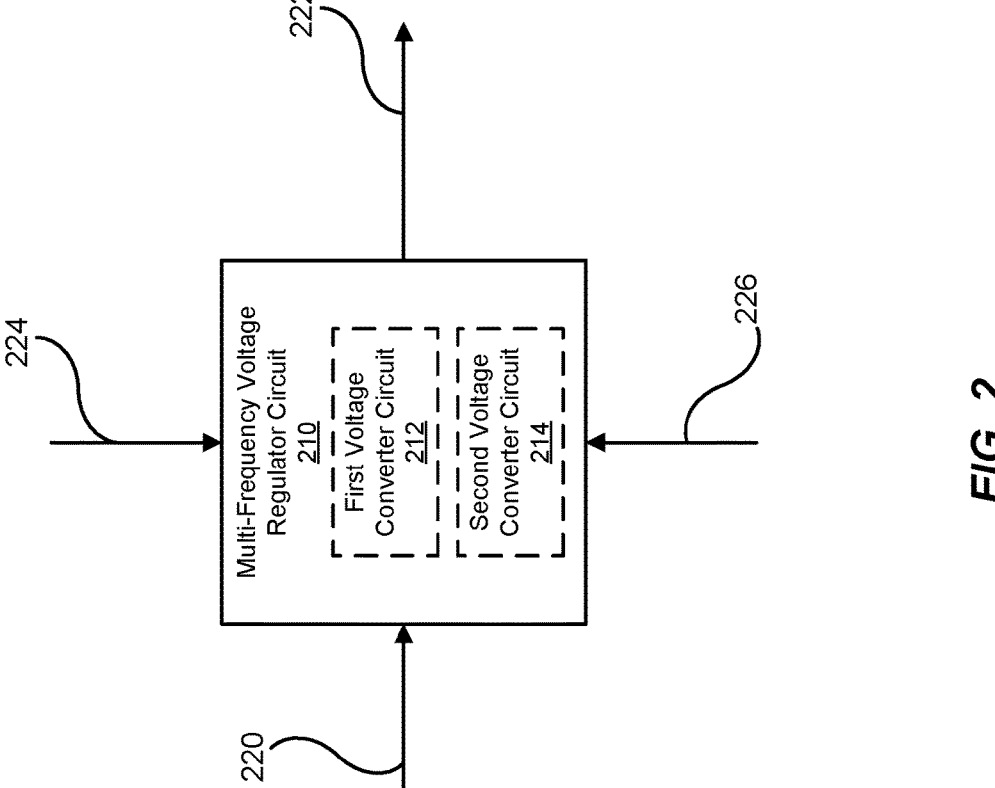
FIG. 2 illustrates an exemplary multi-frequency voltage converter.
Figure 2:

FIG. 2 illustrates a system 200 including an example multi-frequency voltage regulator circuit 210 configured to provide an output voltage 222 from an input voltage 220 and is further capable of operating at two (or more) distinct switching frequencies using a first voltage converter circuit 212 and a second voltage converter circuit 214. A first switching frequency 224 can be set at a lower value to deliver the majority of current. As described herein, higher average current relates to higher inductance, providing higher efficiency. Thus, first voltage converter circuit 212 (corresponding to buck converter 100, multi-level buck converter 101, and/or any other voltage regulating circuit such as a multi-phase converter) can be configured for first switching frequency 224 to provide high efficiency. A second switching frequency 226 can be set at a higher value to deliver high closed loop bandwidth and fast transient response. As described herein, a lower average current relates to lower inductance, providing lower efficiency as a tradeoff for the regulation accuracy. Therefore, second voltage converter circuit 214 (corresponding to buck converter 100, multi-level buck converter 101, and/or any other voltage regulating circuit such as a multi-phase converter) can be configured for second switching frequency 226 to provide good transient response. Thus, in some examples, second switching frequency 226 can be higher (e.g., faster) than first switching frequency 224.

In some examples, first voltage converter circuit 212 includes a first inductor topology (e.g., inductors $L_1[1:N_1]$) and second voltage converter circuit 214 comprises a second inductor topology (e.g., inductors $L2[1:N_2]$). In some examples, the first and second inductor topologies can include different types of inductors and/or inductors of different inductances which can correspond to different switching frequencies. For example, the first inductor topology includes a magnetic core inductor (e.g., a higher inductance for a slower switching frequency), and the second inductor topology includes an air core inductor (e.g., a lower inductance for a faster switching frequency), although the topologies can include other types of inductors such that the first and second topologies include materially different inductances.

In some examples, the voltage converter circuits (e.g., first voltage converter circuit 212 and/or second voltage converter circuit 214) can be configured to operate at different switching frequencies. Thus, in some implementations the desired switching frequencies (e.g., first switching frequency 224 and/or second switching frequency 226) can be inputs to multi-frequency voltage regulator circuit 210 to allow dynamic selection and/or tuning of the desired switching frequencies. In addition, multi-frequency voltage regulator circuit 210 can include additional voltage regulator circuits, such as voltage regulator circuits configured to operate at different switching frequencies than that of first voltage converter circuit 212 and/or second voltage converter circuit 214. Moreover, a control loop or control circuit can be used for managing outputs of the voltage converter circuits (e.g., first voltage converter circuit 212 and second voltage converter circuit 214) to produce output voltage 222, as will be described further below.

Figure 3:
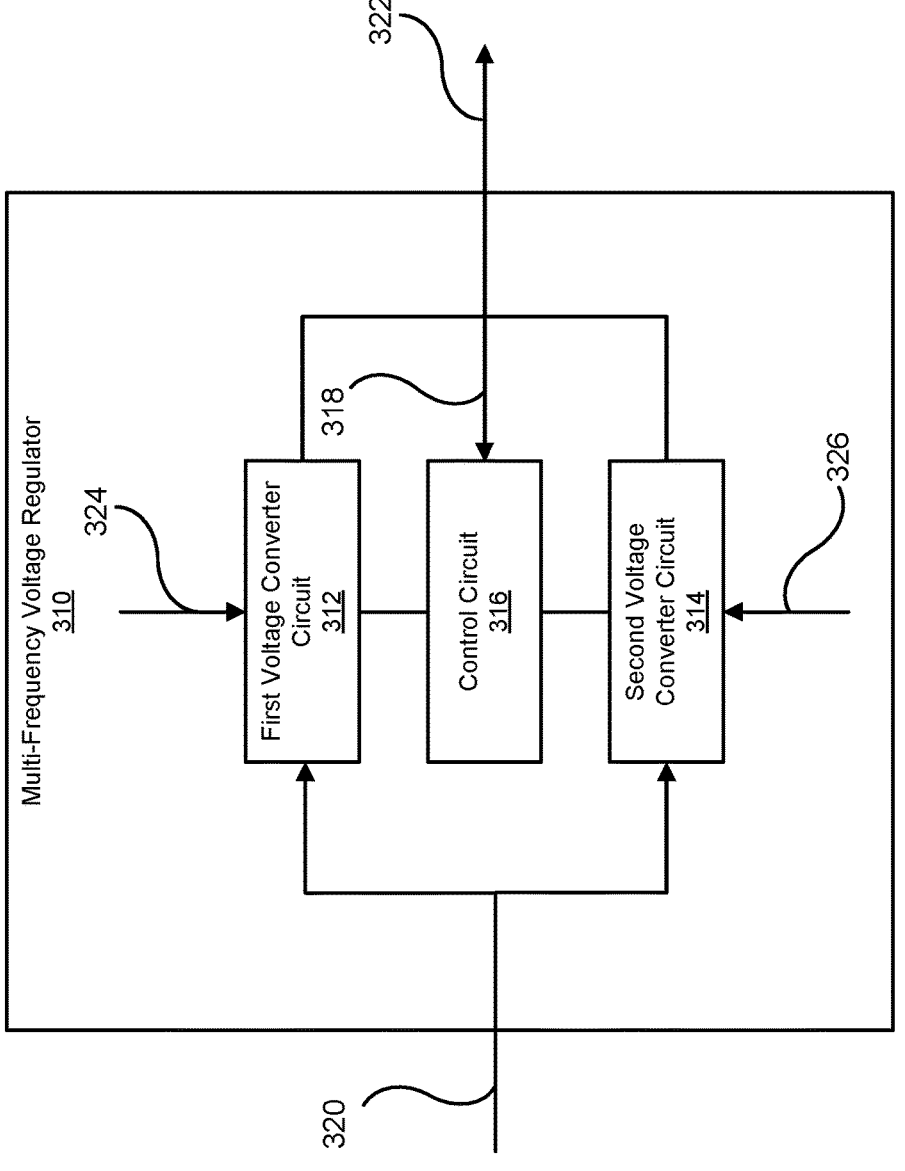
FIG. 3 illustrates an exemplary multi-frequency voltage converter.
Figure 3:
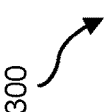

FIG. 3 illustrates a system 300 including a multi-frequency voltage regulator 310 (e.g., a DC/DC converter that can correspond to multi-frequency voltage regulator circuit 210). Multi-frequency voltage regulator 310 includes a first voltage converter circuit 312 (corresponding to first voltage converter circuit 212), a second voltage converter circuit 314 (corresponding to second voltage converter circuit 214), and a control circuit 316. Multi-frequency voltage regulator 310 can produce an output voltage 322 based on an input voltage 320.

First voltage converter circuit 312 can be configured to operate at a first switching frequency 324 (e.g., a low frequency for high efficiency). Second voltage converter circuit 314 can be configured to operate at a second switching frequency 326 (e.g., a high frequency for good transient response). As illustrated in FIG. 3, each of the voltage converter circuits (e.g., first voltage converter circuit 312 and second voltage converter circuit 314) can received input voltage 320 and in conjunction produce output voltage 322. Control circuit 316 can manage or otherwise regulate the outputs of the voltage converter circuits for output voltage 322.

In some examples, control circuit 316 can include a sensor (e.g., a current sensor, voltage sensor, etc.) for each voltage converter circuit as part of a feedback loop 318 (e.g., a current-based feedback loop and/or a voltage-based feedback loop). Control circuit 316 can establish desired target currents for each voltage converter circuit, and based on feedback loop 318 from the sensors, can regulate outputs for each of the voltage converter circuits. In response to a dynamic event (e.g., a fast di/dt transient event on a load) control circuit 316 can respond with changing the current in high frequency path (e.g., second voltage converter circuit 314) for a desired dynamic response, and gradually shift current to the low frequency path (e.g., first voltage converter circuit 312) for efficiency. Thus, the two paths can sum up to a load current. For example, in response to a transient event, second voltage converter circuit 314 can provide a fast response and produce a significant portion of current required to maintain regulator of output voltage 322, to compensate for a slow response of first voltage converter circuit 312. Over time, control circuit 316 can reduce the output of second current of second voltage converter circuit 314 while increasing the output of first current of first voltage converter circuit 312, to better utilize the efficient output of first voltage converter circuit 312 and mitigate the inefficiency of second voltage converter circuit 314. In some examples, control circuit 316 can manage additional voltage converter circuits that can be configured at different switching frequencies, for instance shifting current therebetween as needed.

As illustrated in FIG. 3, first voltage converter circuit 312 and second voltage converter circuit 314 can be connected in parallel. In some examples, the voltage converter circuits can be connected in other configurations, and can include additional components and/or other voltage regulator circuits. In some examples, first voltage converter circuit 312 and/or second voltage converter circuit 314 can be configured for variable frequency operation. In some examples, control circuit 316 can tune or otherwise control first switching frequency 324 and/or second switching frequency 326.

Figure 4:
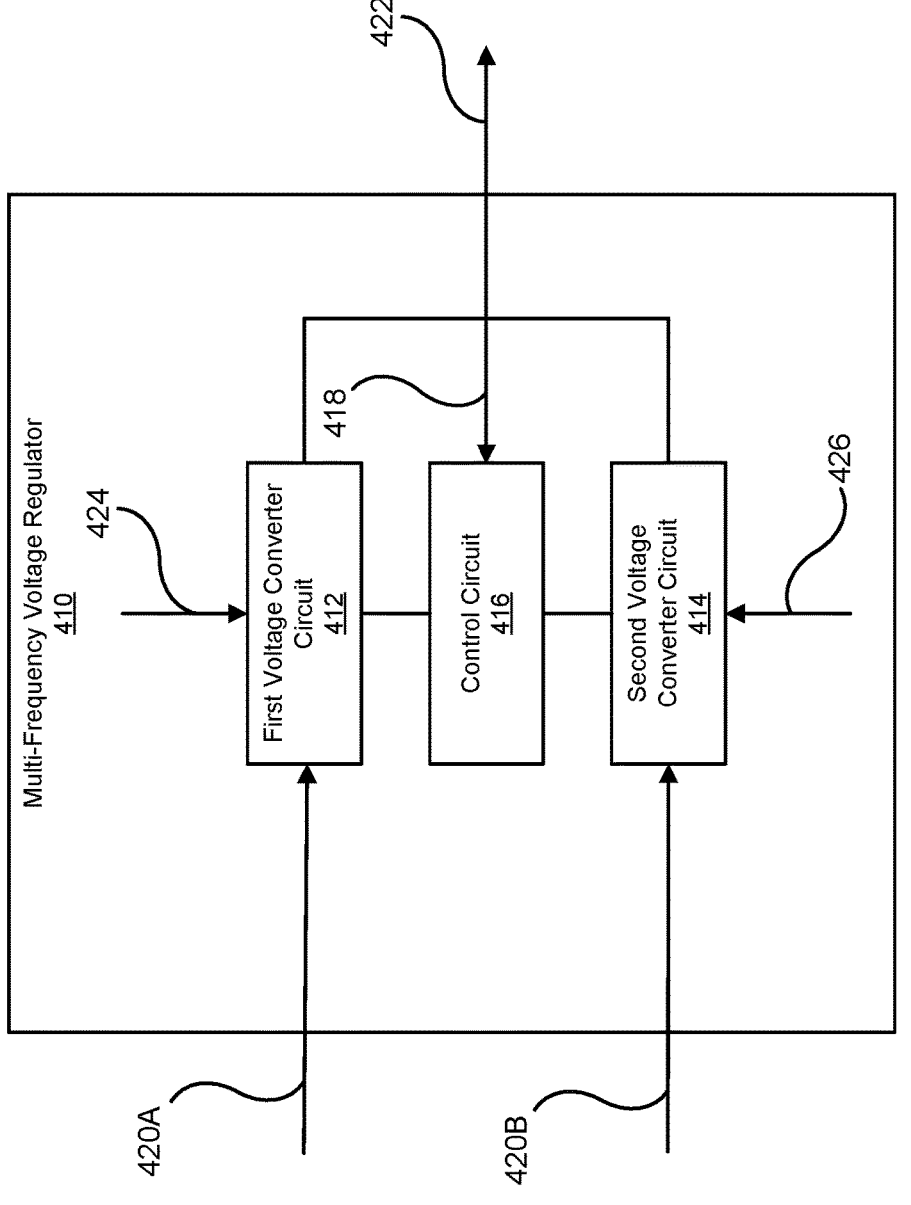
FIG. 4 illustrates an exemplary multi-frequency voltage converter with multiple input voltages.
Figure 4:
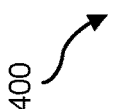

FIG. 4 illustrates a system 400 including a multi-frequency voltage regulator 410 (e.g., a DC/DC converter) which corresponds to multi-frequency voltage regulator 310 and/or multi-frequency voltage regulator circuit 210. Multi-frequency voltage regulator 410 includes a first voltage converter circuit 412 (corresponding to first voltage converter circuit 212 and/or first voltage converter circuit 312), a second voltage converter circuit 414 (corresponding to second voltage converter circuit 214 and/or second voltage converter circuit 314), and a control circuit (corresponding to control circuit 316). First voltage converter circuit 412 can be configured to operate at a first switching frequency 424 (corresponding to first switching frequency 324) and second voltage converter circuit 414 can be configured to operate at a second switching frequency 426 (corresponding to second switching frequency 326). Control circuit 416 can regulate outputs of first voltage converter circuit 412 and second voltage converter circuit 414 using a feedback loop 418 (corresponding to feedback loop 318) such that multi-frequency voltage regulator 410 can produce an output voltage 422.

Multi-frequency voltage regulator 410 can receive multiple input voltages. As illustrated in FIG. 4, a first input voltage 420A can be input to first voltage converter circuit 412 and a second input voltage 420B can be input to second voltage converter circuit 414. In some implementations, an availability of the input voltages (e.g., first input voltage 420A and/or second input voltage 420B) in system 400 can correspond to transient events. For example, an increase in load can correspond to a higher voltage rail being available (e.g., when system 400 exits a low power state). In another example, a decrease in load can correspond to a lower voltage rail being available (e.g., when system 400 enters a low power state). In some examples, only one of first input voltage 420A and second input voltage 420B can be available at specific times (e.g., when entering/exiting a low power state). In some examples, first input voltage 420A can correlate to first switching frequency 424 and second input voltage 420B can correlate to second switching frequency 426. Further, in some examples, control circuit 416 can control which input voltage can be coupled to which voltage converter circuit (e.g., first voltage converter circuit 412 and/or second voltage converter circuit 414).

Figure 5:
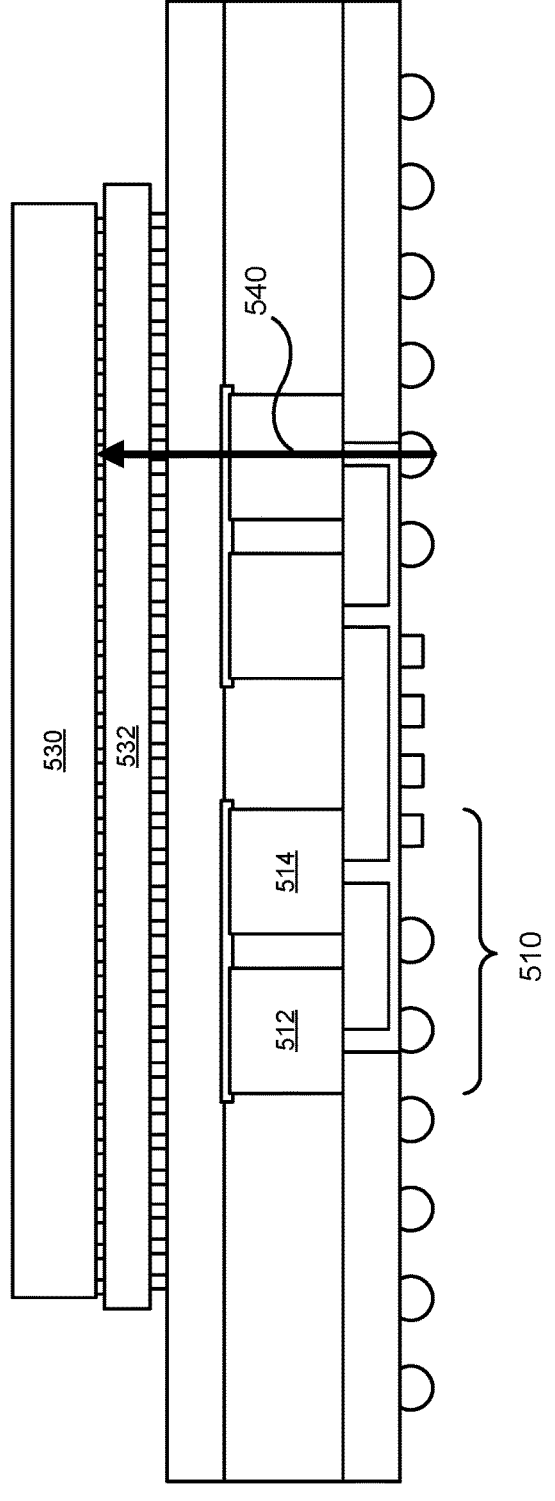
FIG. 5 illustrates an exemplary integrated voltage regulator (IVR) having a multi-frequency voltage converter.

FIG. 5 illustrates a simplified side view of a device package 500 having a multi-frequency IVR 510 (corresponding to multi-frequency voltage regulator circuit 210) including a first voltage regulator circuit 512 (corresponding to first voltage converter circuit 212) and a second voltage regulator circuit 514 (corresponding to second voltage converter circuit 214). Device package 500 includes a die 530 on an interposer 532. Die 530 generally represents a load of multi-frequency IVR 510 and can include various components such as a chip, chiplets, etc. First voltage regulator circuit 512 and second voltage regulator circuit 514 can be configured to deliver current to a supply voltage of die 530.

Multi-frequency IVR 510 can include a control circuit for regulating the supply voltage to the load (e.g., die 530) using first voltage regulator circuit 512 and/or second voltage regulator circuit 514 as described herein. As illustrated in FIG. 5, multi-frequency IVR 510 can be vertically integrated with die 530 such that a signal 540 (e.g., a power signal) is sent vertically (e.g., through multi-frequency IVR 510 to die 530), which can be more efficient than sending signals horizontally (e.g., across a PCB). Accordingly, power can be delivered vertically in device package 500.

As further illustrated in FIG. 5, first voltage regulator circuit 512 and second voltage regulator circuit 514 can be vertically integrated with die 530 in device package 500. In some examples, first voltage regulator circuit 512 includes a first inductor topology vertically integrated with die 530, such as including inductors with embedded magnetic cores. In some examples, second voltage regulator circuit 514 includes a second inductor topology, such as including air core inductors. In other examples, multi-frequency IVR 510 can include other topologies, such as partial vertical integration (e.g., having one of first voltage regulator circuit 512 and second voltage regulator circuit 514 being vertically integrated).

FIG. 6 is a flow diagram of an exemplary method 600 for voltage regulation with a multi-frequency voltage converter. The steps shown in FIG. 6 can be performed by any suitable circuit, device, and/or system, including the system(s) illustrated in FIGS. 2, 3, 4, and/or 5. In one example, each of the steps shown in FIG. 6 represent a process whose structure includes and/or is represented by multiple sub-steps, examples of which will be provided in greater detail below.

As illustrated in FIG. 6, at step 602 one or more of the systems described herein provide, using a fast-response voltage converter circuit in response to a change in a load current, a first output current. For example, first voltage converter circuit 312 (configured with a fast first switching frequency 324 for fast transient response) can output a first output current in response to a change in a load current.

At step 604 one or more of the systems described herein provide, using a slow-response voltage converter circuit in response to the change in the load current, a second output current. A sum of the first output current and the second output current matches the changed load current. For example, second voltage converter circuit 314 (configured with a slow second switching frequency 326 for efficiency) can output a second output current that together with the first output current of first voltage converter circuit 312, matches the changed load current (which corresponds to output voltage 322).

At step 606 one or more of the systems described herein increase a proportion of the changed load current provided by the slow-response voltage converter circuit. For example, control circuit 316 can, using feedback loop 318, increase a proportion of the changed load current (e.g., output voltage 322) provided by second voltage converter circuit 314. As control circuit 316 increases the proportion provided by second voltage converter circuit 314, control circuit 316 can also reduce a proportion of the changed load current provided by first voltage converter circuit 312. In some examples, control circuit 316 can reduce the proportion provided by first voltage converter circuit 312 until second voltage converter circuit 314 provides all or nearly all of the load current/voltage.

As detailed above, the systems and methods described herein provide an integrated voltage regulator (IVR) having a current delivery path broken up in to two (or more) parallel paths. One of the paths can operate at a lower switching frequency and can be optimized to deliver most of the current at high efficiency. The other path can operate at a higher switching frequency, which can deliver less of the total current, and can be optimized to achieve tight regulation accuracy. Thus, the integrated voltage regulator described herein can advantageously overcome the tradeoff between IVR efficiency for bandwidth/transient response and regulation accuracy.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A voltage regulator comprising:
a first voltage converter circuit configured for a first switching frequency to deliver current to an output supply voltage;
a second voltage converter circuit configured for a second switching frequency to deliver current to the output supply voltage, wherein the second switching frequency is distinct from the first switching frequency; and
a control circuit configured to regulate the output supply voltage using the first voltage converter circuit and the second voltage converter circuit based on the first switching frequency and the second switching frequency.

2. The voltage regulator of claim 1, wherein the first switching frequency is slower than the second switching frequency.

3. The voltage regulator of claim 1, wherein the first voltage converter circuit comprises a first inductor topology and the second voltage converter circuit comprises a second inductor topology.

4. The voltage regulator of claim 3, wherein the first inductor topology includes a magnetic core inductor, and the second inductor topology includes an air core inductor.

5. The voltage regulator of claim 1, wherein the first voltage converter circuit and the second voltage converter circuit are connected in parallel.

6. The voltage regulator of claim 1, further comprising a first input voltage for the first voltage converter circuit and a second input voltage for the second voltage converter circuit.

7. The voltage regulator of claim 1, wherein the first voltage converter circuit is configured for variable frequency operation.

8. The voltage regulator of claim 1, wherein the control circuit includes a voltage-based feedback loop.

9. The voltage regulator of claim 1, wherein the control circuit includes a current-based feedback loop.

10. A device package comprising:
a die; and
a voltage regulator comprising:
a first voltage converter circuit vertically integrated with the die and configured for a first switching frequency to deliver current to a supply voltage for the die;
a second voltage converter circuit configured for a second switching frequency to deliver current to the supply voltage, wherein the second switching frequency is distinct from the first switching frequency; and
a control circuit configured to regulate the supply voltage using the first voltage converter circuit and the second voltage converter circuit based on the first switching frequency and the second switching frequency.

11. The device package of claim 10, wherein the second switching frequency is faster than the first switching frequency.

12. The device package of claim 10, wherein the first voltage converter circuit comprises a first inductor topology vertically integrated with the die and the second voltage converter circuit comprises a second inductor topology vertically integrated with the die.

13. The device package of claim 12, wherein the first inductor topology includes a magnetic core inductor, and the second inductor topology includes an air core inductor.

14. The device package of claim 10, wherein the first voltage converter circuit and the second voltage converter circuit are connected in parallel.

15. The device package of claim 10, further comprising a first input voltage for the first voltage converter circuit and a second input voltage for the second voltage converter circuit.

16. The device package of claim 10, wherein the first voltage converter circuit is configured for variable frequency operation.

17. The device package of claim 10, wherein the control circuit includes a voltage-based feedback loop.

18. The device package of claim 10, wherein the control circuit includes a current-based feedback loop.

19. A method comprising:

providing, using a fast-response voltage converter circuit in response to a change in a load current, a first output current;

providing, using a slow-response voltage converter circuit in response to the change in the load current, a second output current, wherein a sum of the first output current and the second output current matches the changed load current; and increasing a proportion of the changed load current provided by the slow-response voltage converter circuit.

20. The voltage regulator of claim 1, wherein the control circuit is configured to regulate the output supply voltage based on the first switching frequency and the second switching frequency by modifying a proportion of the current to the output supply voltage delivered by the first voltage converter or the second voltage converter based on the first switching frequency or the second switching frequency.

\* \* \* \* \*